United States Patent [19] [11] 4,183,007
Baird [45] Jan. 8, 1980

[54] ULTRASONIC TRANSCEIVER

[75] Inventor: James D. Baird, Naperville, Ill.
[73] Assignee: Fischer & Porter Company, Warminster, Pa.

[21] Appl. No.: 879,862
[22] Filed: Feb. 22, 1978
[51] Int. Cl.[2] .......... G01S 9/66; H04R 17/00
[52] U.S. Cl. .......... 367/119; 310/326; 310/369; 73/290 V; 367/908
[58] Field of Search .......... 310/326, 327, 369; 73/290 V; 340/10, 1 L

[56] References Cited

U.S. PATENT DOCUMENTS

| | | | |
|---|---|---|---|
| 3,539,980 | 11/1970 | Massa, Jr. | 340/10 X |
| 3,716,828 | 2/1973 | Massa | 310/369 X |
| 3,739,327 | 6/1973 | Massa | 340/10 |
| 4,031,503 | 6/1977 | Minami | 340/10 X |

*Primary Examiner*—Richard A. Farley
*Attorney, Agent, or Firm*—Michael Ebert

[57] ABSTRACT

A transceiver capable of transmitting and receiving ultrasonic signals for liquid level gauging, the elapsed time between the transmission of a pulse and the reception of an echo pulse reflected from the surface of the liquid being measured to afford an index of the level of the liquid. The transponder is constituted by a piezoelectric transducer assembly suspended within an open-ended casing by an electrically non-conductive elastomeric material which serves to rapidly damp the vibratory activity of the transducer to prevent ringing thereof which interferes with reception. In the assembly, the piezoelectric transducer is sandwiched between a loading plate and a horn-shaped radiating plate, the assembly being held together by a bolt which extends between the plates and passes through the transducer. The transducer operates in the compression mode and is therefore capable of operating reliably with a high voltage drive signal to cause the radiating plate to emit an ultrasonic beam having a narrow angle.

4 Claims, 6 Drawing Figures

ULTRASONIC TRANSCEIVER

BACKGROUND OF INVENTION

This invention relates generally to ultrasonic transceivers, and more particularly to a transponder capable of transmitting and receiving ultrasonic signals for gauging liquid level.

In ultrasonic liquid level measurement, a transmitter at a measuring station emits ultrasonic pulses which are directed toward the surface of the liquid whose level is to be gauged, the transmitted pulses passing through the atmospheric region above the liquid surface. The echo pulses reflected by the liquid surface are picked up by a receiver at the same station, the elapsed time between the transmission and reception of pulses being electronically measured and indicated. Since the elapsed time is proportional to the straight line distance between the measuring station and the liquid surface, it serves as an accurate index to liquid level.

In practice, a liquid level gauge may make use of separate transducers, one for transmission and the other for reception. Or one may employ an ultrasonic transceiver which is capable of both transmitting and receiving ultrasonic signals. The primary concern of the present invention is with transceivers of the latter type.

When an ultrasonic transducer is activated by a short burst of energy to generate an ultrasonic pulse, it continues to ring after the energy is removed. With exisiting types of transceivers, the same transducer cannot always be used both for transmission and reception, in that when measuring short distances between the measuring station and the liquid surface, the vibratory activity or ringing of the transducer at the termination of transmission is not damped with sufficient rapidity to render the same transducer operative as a receiver at the instant an echo pulse reflected from the liquid surface arrives.

In order, therefore, for a transceiver to function properly, the damping must be such as to quickly terminate ringing of the transducer, which damping must be effective through a broad temperature range such as that encountered in an outdoor environment. The shorter the distance between the station and the liquid level, the greater the need for fast damping.

The distance between the measuring station and the surface of the liquid being gauged is referred to as the "dead" distance this dead distance having a minimum value when the liquid reaches its maximum level. It is desirable in liquid level gauging that the dead distance be kept as short as possible.

It has therefore been necessary in liquid level gauging, when the dead distance is short, to provide separate transducers for transmission and reception, in that the damping rate of a typical transceiver was too slow. The inherent cost disadvantages of an arrangement requiring the installation of two transducers are obvious.

In order to effect rapid damping so that the same transducer can function effectively both as a transmitter and receiver, it is known to embed the transducer in an elastomeric medium. Thus U.S. Pat. No. 4,031,503 to Minami discloses a disc-type electrostriction element affixed to a rigid body of greater thickness and suspended within a casing by a diaphragm secured to the body at a vibratory node, the casing being filled with electrically non-conductive elastomeric material.

In addition to effecting rapid damping, the elastomeric medium in the Minami arrangement serves to protectively pot the transducer so that it is not susceptible to erosion in a corrosive environment such as that encountered when taking liquid level measurments in oil wells and mine shafts.

The present invention constitutes an improvement over the Minami arrangement and makes it possible to produce a higher level of ultrasonic energy with decreased ringing, as well as more stable portion over a wide temperature range. The advantages of the present arrangement over that disclosed in the Minami patent will be spelled out in greater detail in a subsequent section of this specification which described a transceiver in accordance with the invention.

SUMMARY OF INVENTION

In view of the foregoing, it is the main object of this invention to provide an improved ultrasonic transceiver characterized by effective damping throughout a wider temperature range, thereby making possible a short "dead" distance.

More particularly, its an object of this invention to provide a transceiver whose transducer assembly includes a piezoelectric transducer of relatively small diameter and yet emits an ultrasonic signal having a narrow beam, thereby focusing the transmitted energy within a relatively small area.

Yet another object of the invention is to provide a transducer assembly which operates in the compression mode and which makes it possible to drive the transducer with a high voltage, thereby enhancing the signal-to-noise ratio of the pulse-echo measuring system.

Briefly stated, these objects are attained in a transceiver which includes a transducer assembly suspended in an open-ended casing by means of a non-conductive elastomeric that fills the casing and serves to dampen the vibratory activity of the transducer, thereby minimizing ringing and isolating the transducer from a corrosive environment.

The transducer assembly includes a transducer formed of a pair of disc-shaped piezoelectric elements in polar opposition between which is interposed an excitation electrode. The transducer is sandwiched between a loading plate and a hornshaped radiating plate, the assembly being held together by a bolt extending between the plates and passing through the transducer. The pair of elements is excited by a drive voltage applied between the electrode and the plates. The bolt acts to compress the assembly to cause the transducer to operate in the compression mode in which it can be driven with high voltage to generate a powerful ultrasonic signal.

The radiating plate whose face diameter is much greater than the diameter of the piezoelectric elements emits a narrow angle ultrasonic beam which is reflected by the surface of the liquid being gauged to produce an echo pulse.

OUTLINE OF DRAWINGS

For a better understanding of the invention as well as other objects and further features thereof, reference is made to the following detailed description to be read in conjunction with the accompanying drawings, wherein.

Figure 4:
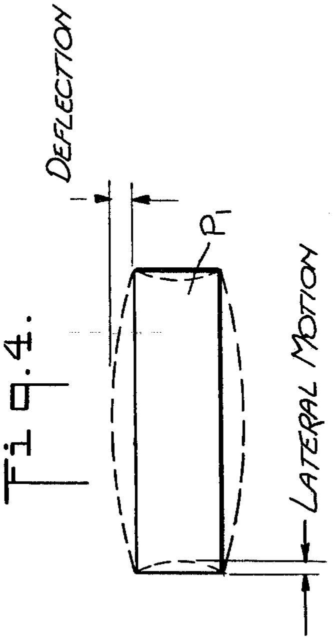
Figure 6:
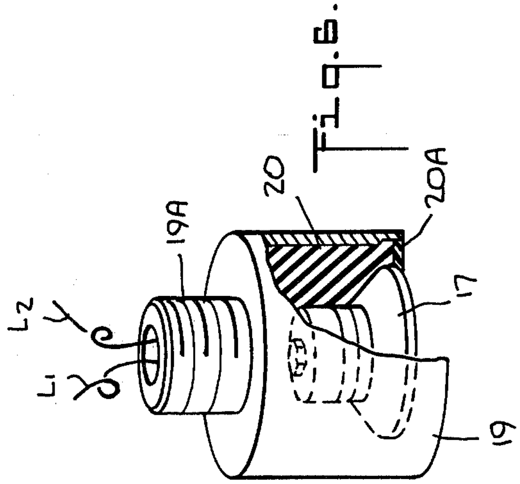
Figure 5:
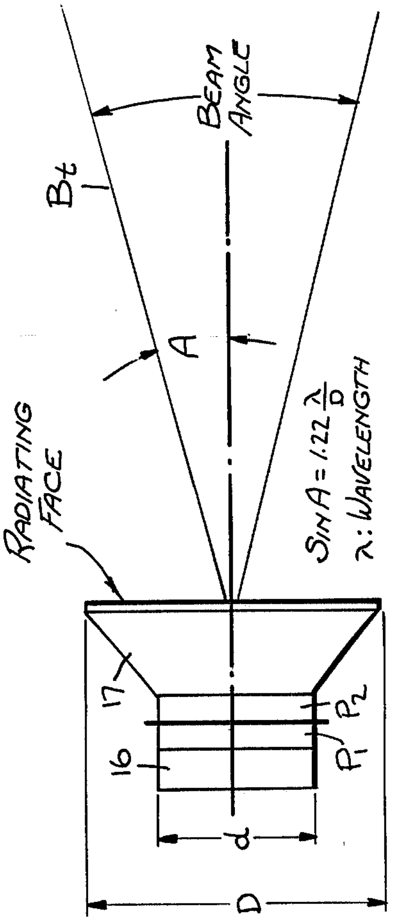
Figure 3:
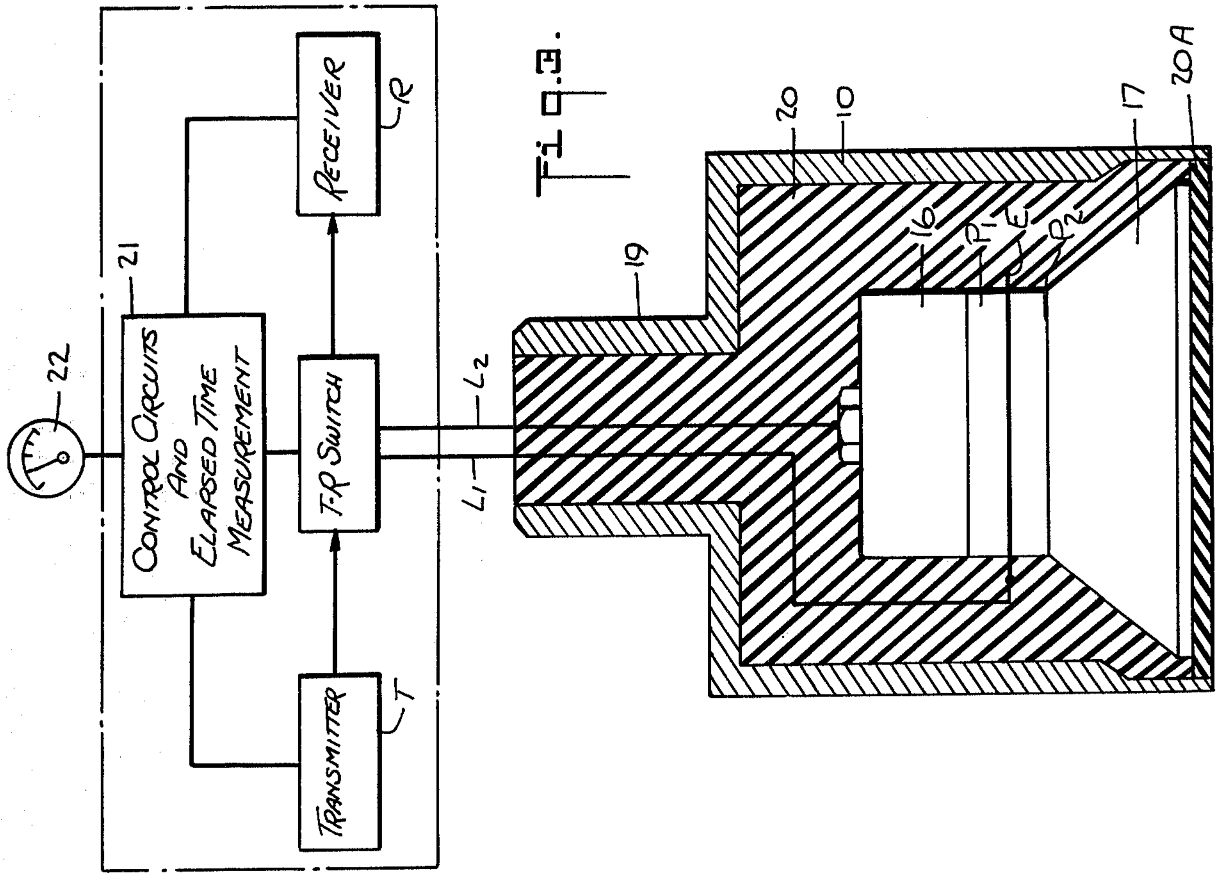

FIG. 3 schematically illustrates the transducer assembly and its associated electronic system;

FIG. 4 shows one of the piezoelectric elements of the transducer included in the transducer assembly and the manner in which it is deflected by the drive voltage;

FIG. 5 illustrates the relationship between the diameter of the piezoelectric elements in the transducer assembly and the angle of the ultrasonic beam radiated thereby; and FIG. 6 is a partial section and illustrated the complete transponder assembly.

DESCRIPTION OF INVENTION

Figure 1:
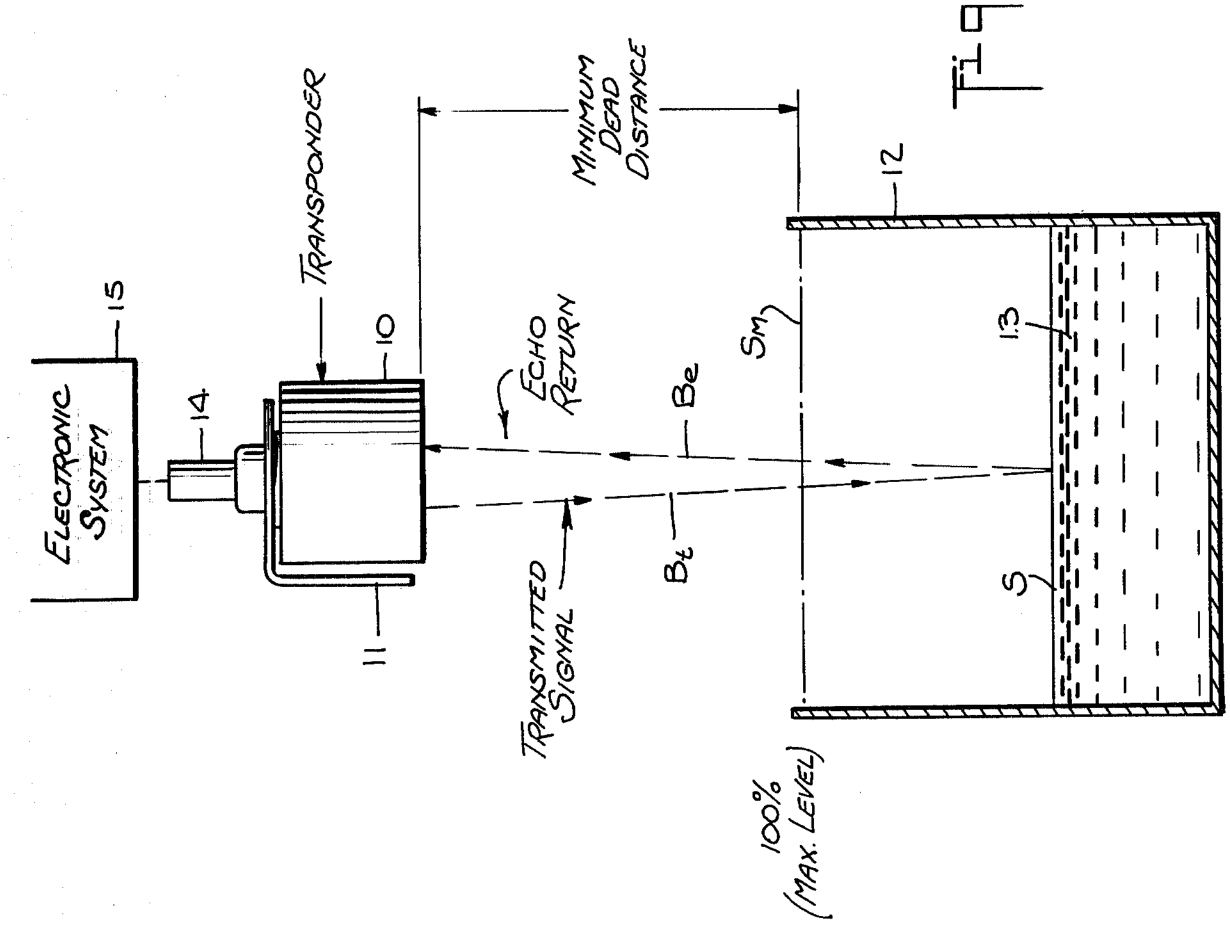
FIG. 1 illustrates a transceiver in accordance with the invention mounted above a well having a liquid therein whose level is to be gauged.

Referring now to the drawings and more particularly to FIG. 1, there is shown a transceiver in accordance with the invention, generally designated by numeral 10. The transponder is mounted by a bracket 11 or other means directly above a well 12 containing a liquid 13 whose level S is to be gauged. Well 12 is merely illustrative of any body of liquid whose level is to be measured.

Transceiver 10 transmits periodic pulses of ultrasonic energy in the form of a focused beam $B_t$ which is directed toward the surface S of the liquid in the well. The ultrasonic energy passes through the atmospheric region above the liquid to strike the surface S thereof and be reflected thereby to produce an echo beam $B_e$ which is received by transceiver 10. The elapsed time between transmission and reception is a function of the distance between the transceiver and the liquid surface, which distance is determined by the liquid level. Transponder 10 is coupled to an associated electronic system 15 of the type shown in FIG. 3 through a cable 14.

The distance extending between transceiver 10 and liquid surface S is referred to as the dead distance. As shown in FIG. 1, this distance attains its minimum value when the liquid is at its 100% or maximum level $S_m$.

As pointed out previously, it is desirable in liquid level gauging to keep the dead distance as short as possible, and to this end it is essential that the transducer cease ringing shortly after its excitation is terminated. It is also important in many applications where gauging is to be carried out in flumes or other liquid housings having small throats, that the spread of the ultrasonic beam be narrow so that the beam focuses on the surface of the liquid and does not impinge on the wall of the liquid housing.

Figure 2:
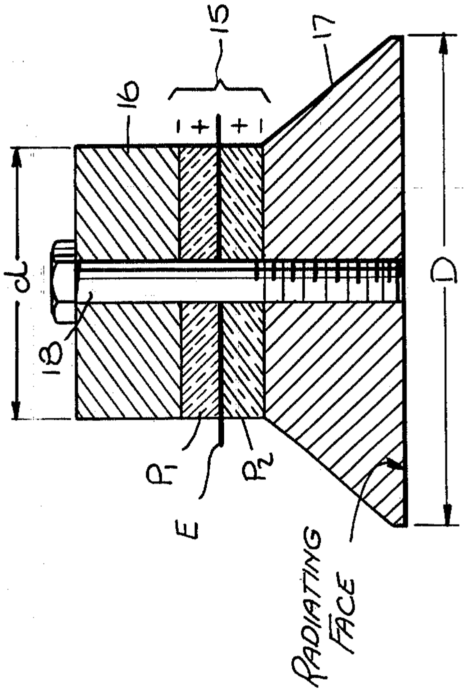
FIG. 2 is a sectional view of the transducer assembly included in the transceiver.

Transceiver 10 is provided with a transducer assembly which, as shown in FIG. 2, includes an ultrasonic transducer, generally designated by numeral 15. Transducer 15 is constituted by a pair of disc-shaped piezoelectric elements $P_1$ and $P_2$ between which is interposed a planar electrode E. Elements $P_1$ and $P_2$ are in polar opposition so that electrode E is in contact with and common to the positive face of both elements.

Transducer 15 is sandwiched between a cylindrical loading plate 16 which constitutes a mass of high density material, and a horn-shaped radiating plate 17. This assembly is held together by a high strength bolt 18 which extends between plates 16 and 17 and passes through transducer 15. Piezoelectric elements $P_1$ and $P_2$ have a relatively low tensile strength, yet it is desirable to drive these elements with high voltage to generate a powerful ultrasonic signal, for this results in a strong echo signal and an enhanced signal-to-noise ratio. Bolt 18 acts to compress the assembly so that the piezoelectric elements are always operated in the compression mode and can be driven with a high voltage.

It is to be noted that cylindrical plate 16 has the same diameter "d" as the disc-shaped piezoelectric elements $P_1$, $P_2$, whereas radiating plate 17 is in the form of a truncated cone whose base diameter matches that of the elements and whose radiating face has a diameter "D" which is much greater than diameter d.

The reason why the relationship between diameter D of the radiating face of plate 17 and diameter d of the piezoelectric elements $P_1$ and $P_2$ is important will now be explained in connection with FIG. 5. The sine of angle A of the ultrasonic beam $B_t$ projected from the transducer is in inverse proportion to the diameter D of the radiating face; the larger this diameter, the smaller the angle. This relationship is established by the equation $\text{SIN } A = \lambda/D$ ; where $\lambda$ is the wavelength of radiation.

Normally, a large value of D is achieved by using piezoelectric elements of large diameter, but this is objectionable in that large elements of this type are quite expensive. Hence the horn-shaped plate 17 provides the required large value of D but at a reduced cost and it also serves as an electrical contact for the transducer.

Plates 16 and 17 are in contact with the respective negative faces of piezoelectric elements $P_1$ and $P_2$ are electrically interconnected by bolt 18. Hence when a drive voltage is applied between bolt 18 and electrode E, this voltage is imposed on both piezoelectric elements.

Elements $P_1$ and $P_2$ exhibit a piezoelectric effect; that is to say, a strain due to a pressure or twisting force applied to the element will cause a voltage to be generated between opposite faces thereof. The reverse effect is encountered when a voltage is applied to the opposite faces of the element; for this voltage causes physical deformation to occur.

As shown in FIG. 4, when element $P_1$ has a voltage applied thereto, a deflection occurs at the opposite faces of the element, this deflection being accompanied by lateral motion. Those prior art arrangements in which a transducer is mounted within a housing by rigid members act to retard this lateral motion and thereby reduce the amplitude of the ultrasonic signal generated by the transducer. In the present arrangement, the transducer is unrestrained laterally.

Plates 16 and 17 act to load the piezoelectric transducer 15 and therefore function to reduce the inherent natural frequency thereof to a degree causing it to resonate within a frequency range applicable to liquid level measurement.

As shown in FIGS. 3 and 6, the transducer assembly is suspended within an open-ended cylindrical casing 19 by means of an elastomeric, non-conductive potting compound 20. This compound is preferably silicone rubber to afford a stable and reliable operation over a wide temperature range and an improved impedance match between the transducer assembly and air.

It will be seen that the face of the radiating plate 17 is parallel to the open front end of casing 19 and is covered by a layer 20A of potting compound. The rear end of casing 18 is provided with a small diameter extension 19A through which the leads $L_1$ and $L_2$ connected to electrode E and bolt 18 pass, the extension also being filled with potting compound.

Since the acoustic impedance of the piezoelectric transducer assembly is high compared to the gaseous or atmospheric medium into which it radiates, a large amount of ultrasonic energy is reflected in the transducer assembly. This signal loss is minimized by elastomeric layer 20A which functions as an interface between the assembly and the medium. This interface is superior to the rigid plastic or metal interface used in many conventional transducers.

The exposed surfaces of plate 16 and those of plate 17 are roughened to improve their bonding to elastomeric potting compound 20 and 20A and to prevent slippage of the transducer assembly during vibratory activity. This elastomeric material functions not only to protect the assembly from a corrosive atmosphere but also to rapidly dampen vibratory activity after the excitation of the transducer is terminated, thereby preventing ringing that would interfere with the reception of echo pulses in a short "dead" distance installation. Potting compound 20 and the covering layer 20A are both of elastomeric material, but they may be of the same or of different material.

As shown in FIG. 3, the electronic system 15 associated with the transceiver 10 through lines $L_1$ and $L_2$ includes a transmitter T which generates a high-frequency voltage that is applied to the transponder by way of a transmit-receive switch T–R, this switch also functioning to couple the transponder to a receiver R. Thus in operation when transmitter T produces a high voltage pulse, this pulse is fed as an excitation pulse to the transceiver by the T–R switch to produce an ultrasonic signal, the switch then connecting the transceiver to receiver R so that an echo pulse thereafter picked up by the transponder is fed to the receiver.

The alternate operation of transmitter T, receiver R and switch T–R is coordinated by a control circuit 21 which also serves to measure the elapsed time between the transmitted and received signals to produce an output signal. This signal is applied to an indicator 22 calibrated in terms of liquid level. A suitable AC drive circuit for exciting the transducer of an ultrasonic level gauge is diclosed in the Minami U.S. Pat. No. 4,034,237, which circuit, in response to a start pulse, generates AC excitation power of constant amplitude and constant frequency.

In automatic process control systems, where liquid level is a process variable, means may be provided to convert the output of electronic system 15 to a current in the standard 4 to 20 mAdc range.

As compared to the Minami arrangement, in which the transducer is suspended within a casing by a diaphragm, the present arrangement has no mechanical linkage between the transducer assembly and the casing, the assembly being suspended completely by the potting material. This results in a higher level output and decreased ringing.

While there has been shown and described a preferred embodiment of an ultrasonic transceiver in accordance with the invention, it will be appreciated that many changes and modifications may be made therein without, however, departing from the essential spirit thereof.

I claim:

1. In a liquid level gauge, the combination of an ultrasonic pulse generator, an ultrasonic pulse receiver and a transceiver coupled alternatively to said generator and to said receiver and capable of transmitting ultrasonic pulses through a gaseous medium toward the surface of the liquid to be gauged and of receiving ultrasonic echo pulses therefrom whereby the elapsed time between the transmission and reception of the pulses is indicative of the level of the liquid, said transceiver comprising:

A. an open-ended casing; and

B. a transducer assembly suspended within said casing by an electrically non-conductive elastomeric material which fills said casing and serves to rapidly damp the vibratory activity of the assembly to prevent ringing thereof which interferes with the reception of the ultrasonic pulses, said assembly including:

(a) a piezoelectric transducer having upper and lower faces;

(b) a loading plate in contact with the upper face of said transducer;

(c) a radiating plate in contact with the lower face of the transducer, said radiating plate having a radiating face adjacent the open end of said casing which is covered by said elastomeric material, said radiating plate being horn shaped and said radiating face thereof having a larger diameter than the diameter of the transducer to produce an ultrasonic beam having a narrow angle; and (d) a bolt extending between said plates and passing through said transducer to compress said transducer to cause it to operate in the compression mode and thereby make it possible to drive the transducer with a high voltage to generate powerful ultrasonic pulses which tend to produce ringing, said ringing being damped rapidly by said elastomeric material, said transducer being formed by a pair of disc-shaped piezoelectric elements in polar opposition, with a planar electrode therebetween in contact with and common to the faces of said elements which are of one polarity, said plates being in contact with the faces of said elements of opposite polarity.

2. A transceiver as set forth in claim 1, wherein the exposed surfaces of said plates are roughened to effect improved bonding with said material.

3. A transceiver as set forth in claim 1, further including means to mount said transceiver over the surface of a body of liquid whose level is to be gauged.

4. A transceiver as set forth in claim 1, wherein said elastomeric material includes a layer portion covering said radiating face, said layer portion having a composition which differs from the remainder of said elastomeric material.

* * * * *

UNITED STATES PATENT OFFICE

CERTIFICATE OF CORRECTION

Patent No. 4,183,007 Dated January 8, 1980

Inventor(s) James D. Baird

It is certified that error appears in the above-identified patent and that said Letters Patent are hereby corrected as shown below:

Column 1, line 6 "transponder" should have read -- transceiver --

Column 2, line 8 "portion" should have read -- operation --

Column 3, line 10 "illustrated" should have read -- illustrates --

Column 3, lines 30 and 31, "Transponder" should have read -- Transceiver --.

Column 4, line 24 before "are" insert -- and --.

Signed and Sealed this

*Twentieth* Day of *May 1980*

[SEAL]

*Attest:*

SIDNEY A. DIAMOND

*Attesting Officer*

*Commissioner of Patents and Trademarks*